United States Patent [19]

Demers et al.

[11] 4,129,011
[45] Dec. 12, 1978

[54] UNDER ICE PIPELAYING

[75] Inventors: Arthur S. Demers, Mount Royal; Lloyd A. Hilz, Calgary, both of Canada

[73] Assignee: Montreal Engineering Company, Limited, Montreal, Canada

[21] Appl. No.: 831,395

[22] Filed: Sep. 8, 1977

[30] Foreign Application Priority Data

Aug. 25, 1977 [CA] Canada .................................. 285448

[51] Int. Cl.² .............................................. F16L 1/04
[52] U.S. Cl. ................................................. 405/169
[58] Field of Search ................. 61/105, 107, 108, 109, 61/110, 111, 114, 1 R

[56] References Cited

U.S. PATENT DOCUMENTS

| 3,559,413 | 2/1971 | Silverman | 61/108 |
| 3,600,898 | 8/1971 | Godfrey et al. | 61/107 |
| 3,950,955 | 4/1976 | Meeres | 61/107 |

FOREIGN PATENT DOCUMENTS 2056010  5/1971  France ........................ 61/108

Primary Examiner—Mervin Stein
Assistant Examiner—David H. Corbin

[57] ABSTRACT

A method of laying an underwater pipe line under an ice sheet. The pipe is fabricated on shore at a make-up point and a plurality of support stations are spaced apart along the pipe path. Holes are bored in the ice at the support stations and low friction pipe support cradles are lowered underwater at the stations and anchored to the ice sheet. A trench is then cut in the ice and the pipe string is introduced into the water and towed across beneath the ice surface through the support cradles by means of pulling winches at a winching station or stations. As the leading end of the pipe being towed under the ice passes each support station the pipe support cradles are tightened so as to support the pipe string from the ice sheet and immediately beneath it. After the pipe has been towed to the opposite shore, the pipe is lowered to the water bottom by attaching a train of lowering winches to the pipe through the trench. Each of the lowering winches take up the support of the pipe and lowers it in turn to the water bottom as corresponding support cradles are released, one after the other.

10 Claims, 6 Drawing Figures

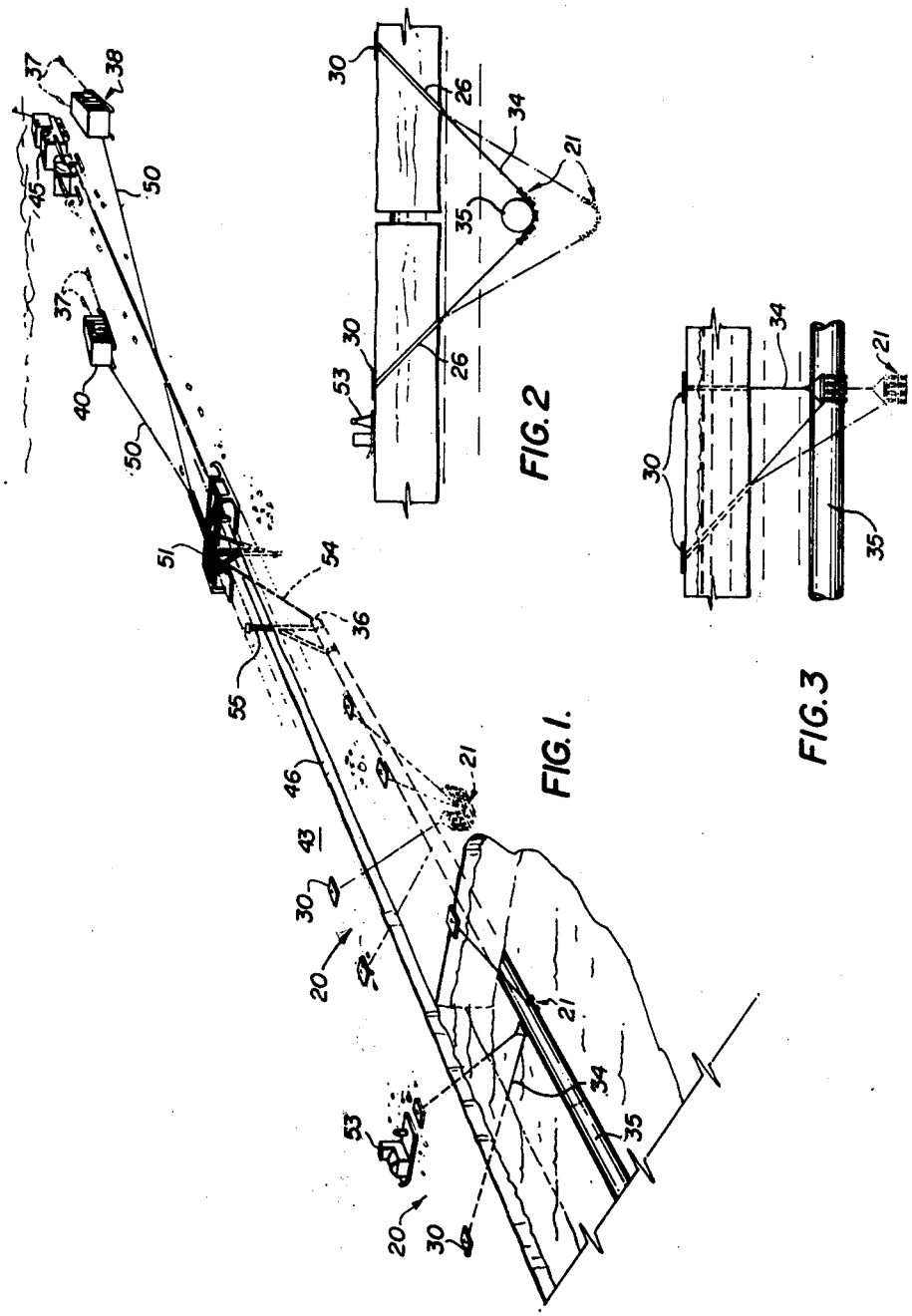

UNDER ICE PIPELAYING

BACKGROUND OF THE INVENTION

The present invention is related to a method of laying underwater pipe lines under an ice sheet.

A number of methods have been proposed for laying a pipe across an ice covered channel, for example, a proposal to prepare a pipe string and lay it on the ice and thereafter lower the prepared pipe string from the ice surface down a pipe guideway through a slot in the ice, the guideway being supported by a series of gantries.

Different ice conditions and different lengths of span not to mention depths of water, prevailing current etc. all tend to make different approaches to the pipe laying problem necessary.

The present invention seeks to provide a method of pipe laying which is generally universally useful and particularly, useful for severe conditions such as those encountered in the Arctic.

SUMMARY OF THE INVENTION

According to the present invention, there is provided a method of laying an underwater pipeline under an ice sheet comprising: fabricating a pipe string at a make-up point; providing a plurality of support stations spaced apart along a projected direction of pipe laying; introducing pipe support cradles at said support stations, anchored to said ice sheet; cutting a trench in the ice from a point of pipe entry into the water which trench follows said direction; towing a pipe string beneath the surface of said ice sheet and through said support cradles; actuating each said support cradle to engage and support said pipe string after the leading end thereof passes each support station so that said pipe string is supported from said ice sheet and immediately beneath it; continuing to tow and support the ice string until the required length of pipe is in place; and lowering said pipe to the water bottom.

Preferably, a series of spaced pipe pulling stations are arranged in the ice along the direction of pipe laying and pipe pulling means are provided which are moved from pulling station to pulling station as the pipe is towed into position.

According to another preferred feature of the invention, the pipe pulling winches are connected by cables to an on-ice sled and a second cable means is connected between the sled and a pipe pulling head at the leading end of the pipe string. With such a configuration, it is possible to stabilize the pipe during towing by an upstanding guide member connected to the pipe pulling head and extending upwardly through the trench.

Conveniently, the length of the cable between the sled and the pipe pulling head may be varied to control the vertical component of the pull load.

According to a preferred feature of the invention, the pipe is lowered to the water bottom by attaching a train of lowering winches to the pipe through the trench, each of the lowering winches taking up the support of the pipe and lowering it, in turn, as corresponding support cradles are released seriatim. The lowering winches may be operated in leap-frog fashion so that when a lowering winch completes its operation of lowering the pipe to the water bottom it is released from the pipe and moves forward along the pipe direction to the front of the train of pipe laying winches.

BRIEF DESCRIPTION OF THE DRAWINGS

The following is a description by way of example of one embodiment according to the present invention, reference being had to the accompanying drawings in which:

FIG. 1 is a diagrammatic representation of the under ice towing of a prefabricated pipe string;

FIG. 2 is an end view, showing the pipe support cradle in relaxed and in pipe supporting condition;

FIG. 3 is a side view of the cradle seen in FIG. 2 again shown in the lowered and pipe supporting condition;

DETAILED DESCRIPTION OF PREFERRED EMBODIMENT

Figure 4:
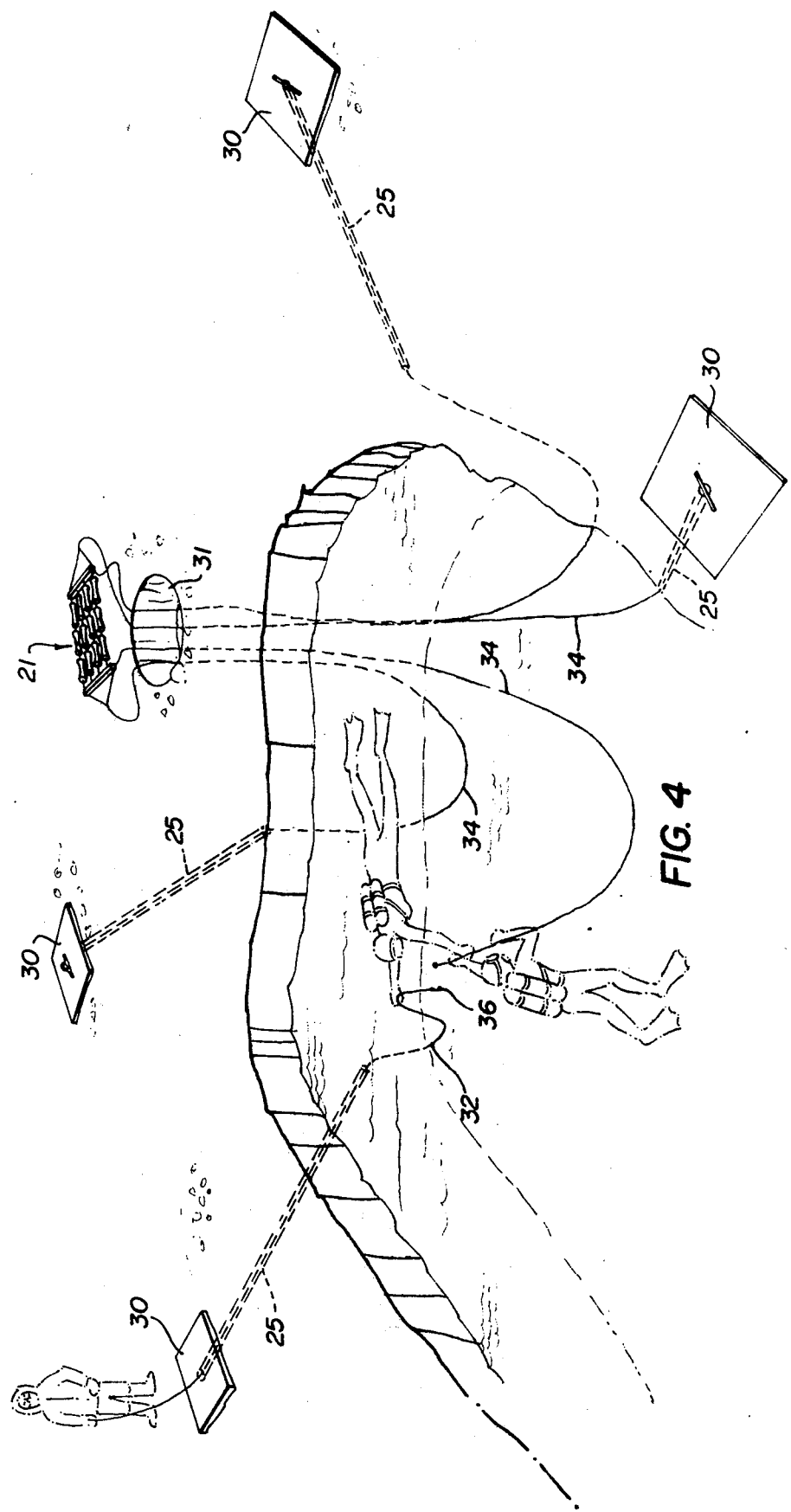
FIG. 4 is a detail illustrating the manner in which the support cradle is introduced into position.

Referring now to the drawings, the center line of the projected pipe line route is set out and staked by a survey team which also obtains a continuous profile of the ice thickness along the pipe line route. The ice profile is used to predetermine the profile of the pipe as it is pulled. The entire right-of-way on the ice is prepared by tractors and if areas of ice are found which are not of acceptable thickness, these areas are thickened by flooding operations.

A shore pipe make-up area 10 (FIG. 5) is prepared for the stringing of pipe sections. The make-up area 10 is identical in every respect to the make-up area required for a bottom pull operation as it is known in the art. The length of pipe string is governed by site topography but a typical string would be 600 meters in length.

A series of support stations 20 which provide locations for roller support cradles 21 are set up at intervals along the projected direction of pipe laying across the entire channel C. Holes 25 for support cradle sleeves 26 are drilled using a machine mounted auger. These holes are drilled at approximately 45° and radiate inwardly to a central point. A cradle sleeve pipe 26 is then inserted into each hole with a bearing plate 30 attached at the upper end of the sleeve pipe 26. A large center hole 31 (FIG. 4) is then formed with a machine mounted auger at each of the support stations 20. This hole 31 is to provide access for divers and for the introduction of low friction roller cradles 21. Small cables 32 with hooks or shackles 36 attached are threaded through the sleeve pipes 26 from the surface. Divers then enter the water and attach the main support cables 34 for the roller support cradle 21 to the hooks on the small cables 32. The length of the main support cables 34 has previously been determined in accordance with the pipe profile with is governed by the ice thickness. The small cables 32 are then pulled through the sleeve pipes to the ice surface and the support cables 34 pass through with them. The bearing plates 30 are then attached to the support cables and the support cradle 21 is then lowered through the hole 31 in the ice. As will be seen in the dotted lines in FIGS. 2 and 3 the support cradle 21 is deliberately positioned several feet below the predetermined level of the pipe 35 at this stage and will only be raised to its final support position after the leading end or pulling head 36 (FIG. 1) of the pipe 35 has passed the support position 20. In this way, the possibility of snagging the pipe pull head 36 on the support cradles 21 during the pulling operation is avoided. As shown, the support cradles 21 have four support cables 34 two of which provide support only and two of which provide hold-back to the cradles during the pulling operation. It is to be understood, however, that it may be necessary under certain circumstances to have two more restrained cables to provide hold-back for the cradles in the event that it becomes necessary to reverse the direction of pull temporarily.

Whilst the support cradles 34 are being installed, ice anchors 37 are frozen into position to provide pipe pulling stations 38 along the pipe path. These ice anchors 37 hold pipe pulling winch means 40 into position and a plurality of pipe pulling winches 40 may be provided in leapfrog sequence so that whilst the pipe is being pulled by one set of pipe pulling winch means a second pipe pulling set of winch means may be being anchored at the next pipe pulling station along the ice.

At a position 42 on the seaward side of the rough fore shore ice an opening 43 is cut for the pipe 35 to pass through. The opening 43 in the ice is maintained ice free throughout the pulling operation. A trenching machine 45 is positioned on the ice at the end of the opening 43 and commences the construction of a trench 46 across the Channel C. In order to initially place the pipe leading end in the water, pipe pulling winch means 40, which may be drum winches or linear winches or any other suitable pulling equipment, are connected to a first set of ice anchors 37, pull cables 50 are attached directly to a pipe pulling head 46. The first section of pipe is then pulled through the opening 43 in the ice 42 and the pull cables 50 are detached.

An on-ice pull sled 51 is then attached to cables 50 from the winches 40 and a second cable means 54 is connected between the sled 51 and the pipe pulling head 36 which is positioned at the leading end of the pipe string.

The pipe pulling operation proper, then commences and, as the pipe leading end 36 is towed past each support station 20, the support cradle 34 is raised to its operating position by hoists 53 or any other suitable fashion. The towing operation moves forward and stops at the end of every pipe string to allow a tie-in to be made on shore. Depending upon the spacing, the winches 40 are moved from their new locations at every second or third stop and other previously located, winches 40 take over whilst the first set of winches are being moved.

The operation is continued until the entire pipe line 35 is in position across the channel C beneath the ice surface. Since the trenching machine 45 proceeds immediately ahead of the pull sled 51 there is no problem with refreezing of the slot 46 and partial opening or closing of the slot 46 in the ice has little or no effect on the pulling operation but should such a movement take place, it may be necessary to adjust the elevation of the support cradles 21.

A vertical steel member 55 attached to the pipe pulling head 36 projects through the trench 46 above the ice surface and guides the pipe 35 whilst at the same time preventing rotation.

Since the pull load increases as the pipe 35 is pulled across the channel C, the lift component on the inclined pull cable 54 tends to raise the pipe head 36 if the angle of the pull cable were constant. Consequently, it may, under certain circumstances, be necessary to make a provision for varying the length of cable 54 between the sled 51 and the pulling head 36, in order that the vertical component of the pull load remains constant. This constant vertical component could then be counter balanced by weighting the pulling head 36 to a predetermined amount prior to commencing the pull.

Now that the pipe line has been towed across the channel C, and a sufficient extra length 70 of pipe fabricated and towed onto the shore 71 to accommodate for the increased length of the pipe length when on the channel bottom, the second phase of the operation commences.

Figure 5:
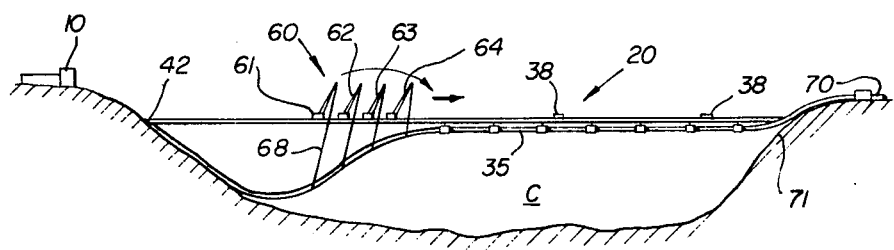
FIG. 5 is a schematic cross section across a channel showing a preferred manner of lowering the pipe line to the sea bottom.
Figure 6:
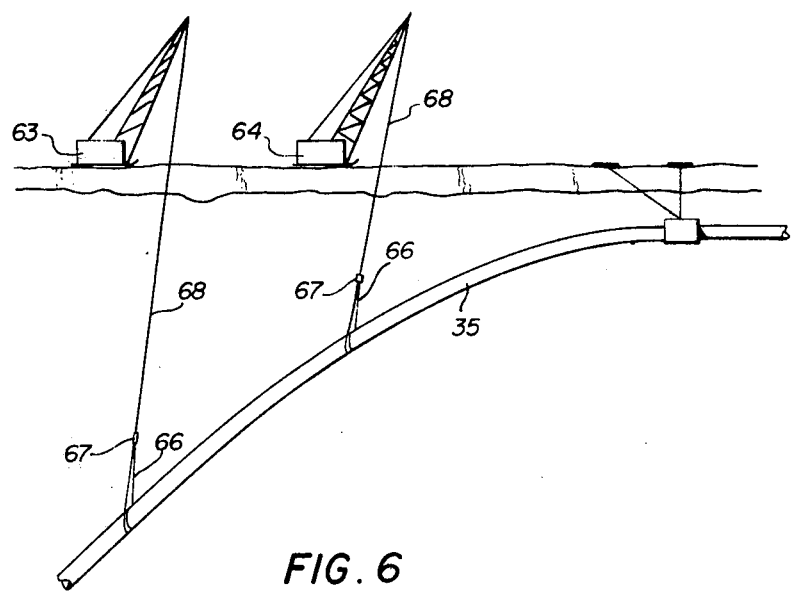
FIG. 6 is detailed to an enlarged scale of the arrangement shown in FIG. 5.

Reference is now made to FIGS. 5 and 6. A train 60 of lowering winches, shown in FIG. 5 as comprising four such lowering winches 61, 62, 63, 64 are positioned along the ice surface adjacent the trench 46 which at this stage may require cleaning. Guide cables upstream or downstream, not shown, may be provided if current conditions so warrent. Cable slings 66 which include release mechanisms 67 are attached to the pipe line 35 and hooked onto the lowering cable 68 from the winch. The load of the pipe is taken up on the winch cables and a first set of roller supports adjacent a first winch is released and recovered. This is repeated by a second winch, etc. The pipe line is then lowered by paying out the cable from the winch 64 and applying a hold back tension by moving the winch forward during the lowering operation (see FIG. 6). The release cable 66 is removed after it has reached a predetermined depth and the cable 68 is rewound on the winch drum. The end winch 61 of the train 60 now leap-frogs forward in front of the first winch 64 and the serial release of the cradle support means continues as the winch 61 repeats its take up and lowering of the pipe line 35. The winch number 62 now becomes the last winch in the train and when it has completed its lowering operation, it too releases from the pipe and leap-frogs forward in front of winch number 61 when again the release of the next support crade 21 is effected, and so on.

It will be understood, of course, that under certain circumstance, it may be desirable to vary somewhat the sequence of the operation as described. For example, the trenching machine 45 may cut the trench 46 before the support cradles 21 are introduced into the water. The appended claims should be read in this light.

It will further be understood that the method described hereinbefore is equally applicable to the laying of underwater pipelines which connect with submarine access tunnels as well as shore-to-shore installations as illustrated.

What we claim as our invention is:

1. A method of laying an underwater pipeline under an ice sheet comprising: fabricating a pipe string at a make-up point on shore; forming discrete openings in the ice sheet to provide a plurality of support stations spaced apart along a projected direction of pipe laying; introducing underwater pipe support cradles through said openings to said support stations; anchoring said cradles to said ice sheet; cutting a trench in the ice from a point of pipe entry into the water which trench follows said direction; towing said pipe string from said make-up point beneath the surface of said ice sheet and through said support cradles; actuating each said support cradle to engage and support said pipe string after the leading end thereof passes each said support station so that said pipe string is supported from said ice sheet and immediately beneath it; continuing to tow and support the pipe string until the required length of pipe is in place; attaching lowering means to said pipe; releasing said cradles seriatim, and lowering said pipe to the water bottom.

2. A method as claimed in claim 1 further comprising: providing a series of spaced pipe pulling stations in the ice along said direction.

3. A method as claimed in claim 2 in which pipe pulling winch means are provided which are moved from pulling station to pulling station as the pipe is towed into position.

4. A method as claimed in claim 3 in which the pipe pulling winches are connected by cables to an on-ice sled, a second cable means being connected between said sled and a pipe pulling head at said leading end of said pipe string.

5. A method as claimed in claim 4 further comprising stabilizing said pipe during towing by an up-standing guide member connected to said pipe pulling head and extending upwardly through said trench.

6. A method as claimed in claim 4 further comprising varying the length of cable between the sled and the pipe pulling head to control the vertical component of the pull load.

7. A method as claimed in claim 1 in which said lowering means includes lowering cables each attached to one of a train of lowering winches and to the pipe; each of said lowering cables taking up the support of the pipe and lowering it, in turn, as corresponding support cradles are released.

8. A method as claimed in claim 7 in which the lowering winches are operated in leap-frog fashion so that when a lowering winch completes its operation of lowering the pipe to the water bottom it is released from the pipe and moves forward along said direction to the front of said train of pipe laying winches.

9. A method as claimed in claim 1 in which said pipe support cradles are roller cradles.

10. A method as claimed in claim 7 in which during the lowering of the pipe to the water bottom the lowering cables are inclined in the direction of pipe laying whereby to introduce a tension in the pipe being lowered.

* * * * *